(12) United States Patent
Nelson et al.

(10) Patent No.: US 10,375,272 B2
(45) Date of Patent: Aug. 6, 2019

(54) STABILIZING IMAGE FORMING QUALITY

(71) Applicant: Hewlett-Packard Development Company, L.P., Houston, TX (US)

(72) Inventors: Marvin D Nelson, Meridian, ID (US); Kurt Robert Bengtson, Eagle, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/778,411

(22) PCT Filed: Mar. 22, 2016

(86) PCT No.: PCT/US2016/023610
§ 371 (c)(1),
(2) Date: May 23, 2018

(87) PCT Pub. No.: WO2017/164850
PCT Pub. Date: Sep. 28, 2017

(65) Prior Publication Data
US 2018/0352112 A1    Dec. 6, 2018

(51) Int. Cl.
*H04N 1/413* (2006.01)
*B41J 2/195* (2006.01)
*H04N 1/032* (2006.01)
*H04N 1/407* (2006.01)
*H04N 1/50* (2006.01)

(52) U.S. Cl.
CPC .............. *H04N 1/413* (2013.01); *B41J 2/195* (2013.01); *H04N 1/032* (2013.01); *H04N 1/407* (2013.01); *H04N 1/504* (2013.01)

(58) Field of Classification Search
CPC . H04N 1/413; H04N 1/00058; H04N 1/40006
See application file for complete search history.

(56) References Cited

U.S. PATENT DOCUMENTS

| 6,665,425 B1* | 12/2003 | Sampath ............ H04N 1/00002 358/1.15 |
| 7,319,826 B2 | 1/2008 | Shim |
| 7,986,421 B2* | 7/2011 | Chen .................... G06F 3/1207 358/1.14 |
| 8,384,963 B2 | 2/2013 | Kumamoto et al. |
| 9,060,078 B2* | 6/2015 | Szymanski ........ H04N 1/00015 |
| 9,069,494 B2 | 6/2015 | Kirby et al. |

(Continued)

FOREIGN PATENT DOCUMENTS

| EP | 0768580 A2 * | 4/1997 | ......... G03G 15/5037 |
| EP | 1109395 B1 | 5/2008 | |

OTHER PUBLICATIONS

QualityLogic Inc., Brother Printer Cartridges vs. Aftermarket Printer Cartridges, 2011, 8 pages.

*Primary Examiner* — Ted W Barnes
(74) *Attorney, Agent, or Firm* — HP Inc. Patent Department (57) ABSTRACT

In one example, image forming quality is stabilized by monitoring aging characteristics of an image forming system including its set of supplies. When an age-related triggering event occurs, a set of modified parameters are substituted for a set of standardized parameters. This substitution increases the image forming quality while sacrificing some visual acuity based on user preferences from psychometric testing.

15 Claims, 5 Drawing Sheets

(56) References Cited

U.S. PATENT DOCUMENTS

| | | | |
|---|---|---|---|
| 2003/0091356 A1* | 5/2003 | Komatsu | G03G 15/5037 399/49 |
| 2005/0117926 A1* | 6/2005 | Tanaka | G03G 15/0126 399/49 |
| 2005/0157327 A1* | 7/2005 | Shoji | G06K 15/408 358/1.14 |
| 2006/0203072 A1 | 9/2006 | Naugler et al. | |
| 2009/0016649 A1* | 1/2009 | Wilsher | G06T 5/001 382/309 |
| 2009/0059258 A1 | 3/2009 | Hikosaka | |
| 2009/0080040 A1* | 3/2009 | Lieberman | H04N 1/40 358/504 |
| 2009/0109453 A1* | 4/2009 | Nakahara | G03G 15/5062 358/1.9 |
| 2010/0040355 A1* | 2/2010 | Craen | G03B 13/32 396/90 |
| 2011/0149331 A1* | 6/2011 | Duggan | G06K 9/036 358/1.14 |
| 2011/0286014 A1* | 11/2011 | Wu | H04N 1/40006 358/1.9 |
| 2017/0153564 A1* | 6/2017 | Kanaya | G03G 15/0266 |

\* cited by examiner

Example Laser Printer Procedures and Data 600

Procedures
Test Pattern Production 602
Age Related Trigger Event Monitoring 604
    Number of Images
    Age (in time)
    Number of Cleaning Cycles
    Number of Paper Jams
Substitution of Modified Parameters for Standardized Parameters 606

Product Age Parameters 610
    Systematic Engine 612
        Time 614
            Power Supply Efficiency
            Power Variations
            Grounding Changes
        Page Count 616
            Gear Wear
            Laser Diode Efficiency
            Transport/Transfer Properties
            Optical Path Degradation
    Supplies 618
        Cartridge Change 620
            OPC sensitivity
            Mechanical Changes
            Toner Changes
            Property vs. Cartridge Life Printer Control Parameters 622
    Developer Bias
    Charge Level
    Fuser Temperature
    Transfer Voltage
    Laser Power
    Dot Modulation
    Dot Resolution
    Pulse Width Modulation
    Line Screens
    Edge Enhancers
    Half-Tone Screening Image Forming Defects Adjusted by Modified Parameters 624
    Banding
    Tone Scale
    Line Width and Spacing
    Solid Area Density
    Dot/Hole Ratio
    Scatter Database of Adjusted Printer Control Parameters 626
    Standardized 630
    Modified – Indexed by age-related event 632
    Modified – Indexed by supply items 634
    Modified – Indexed by user preferences 636

STABILIZING IMAGE FORMING QUALITY

BACKGROUND

Many image forming devices such as printers, copiers, plotters, etc. include supplies which are replaced many times over the life of the device. In some markets, lifetime based supplies are used in image forming devices rather than replaceable supplies. Continuing competition and customer demands continue to drive the price of these devices and their supplies downward. To remain competitive in the market place, the component costs of the device and its supplies may need to he reduced or the performance of the image forming device improved over previous models.

BRIEF DESCRIPTION OF THE DRAWINGS

This disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

Described within are methods and systems for an open-loop technique to stabilize image forming quality as an image forming device ages and wears over time. This new technique allows consumers or users of "well used" devices an opportunity to improve the image forming quality of the device output with minimal degradation of visual acuity. To achieve this opportunity, the characteristics of the aging of the image forming device and its supplies are well characterized with respect to a set of standardized image forming configuration parameters and how those standardized image forming configuration parameters may be modified to affect the print output.

Many image forming systems use a closed-loop calibration system to compensate an image forming systematic engine for various degradation factors. For instance, in some systems, a test pattern is printed and an image sensing device is used to determine the difference between expected and actual image forming results. Based on the detected differences, a new set of calibration parameters are used to reduce or eliminate the detected degradation factors. While high margin image forming systems may be able to accommodate such closed-loop feedback systems, low margin image forming systems may not have a closed-loop or other method available to compensate for aging image forming systems and its supplies. Further, if the dosed-loop feedback system can be removed, the material cost of the image forming device may be reduced leading to at least one of higher margins and lower cost to the customer.

Figure 1:
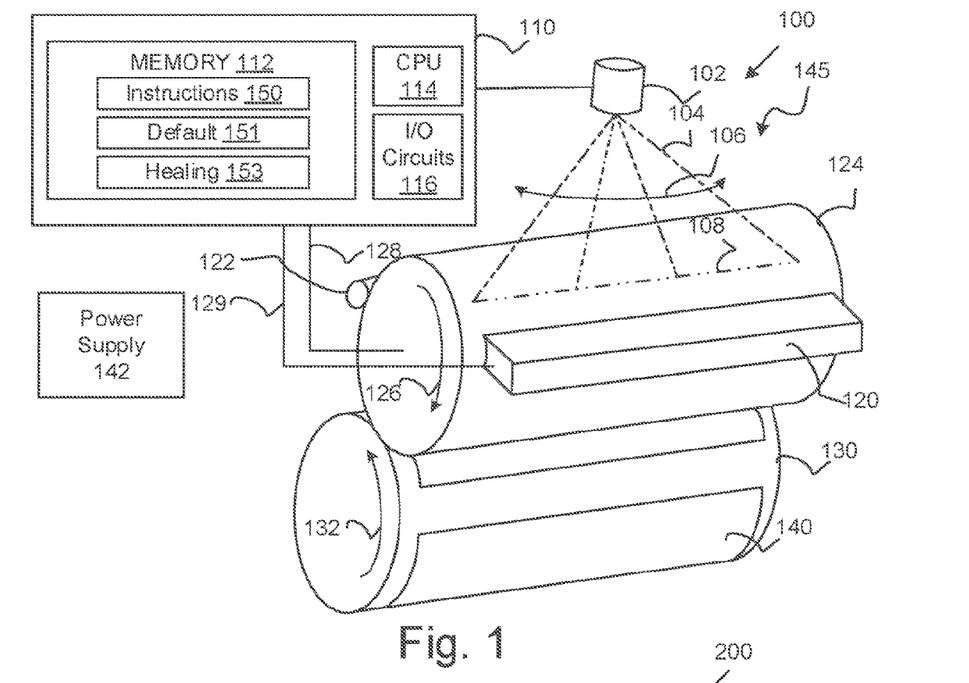
FIG. 1 is an illustration of one example of a laser-based image forming system.

FIG. 1 is an illustration of one example of a laser-based image forming system 100, such as an electrographic printer. Although in this example, a laser-based image forming system 100 is shown, the claimed subject matter is not so limited to only laser-based systems. For instance, the claimed subject matter may be used with fluid based marking systems such as ink-jet printers, ink-jet plotters, ink-jet fax machines, and ink-based web-press systems. The claimed subject matter may also be used with toner-based marking systems such as laser-jet printers, copiers, and fax machines. In various examples, the different image forming systems may have one or more consumable supplies. In other examples, the image forming systems may contain a refillable or non-refillable lifetime based supply of consumable fluid, wax, or toner.

The laser-based image forming system 100 includes a systematic engine 145 including a light source, such as a laser diode 102, that produces a modulated coherent beam 104 that is scanned transversely back and forth as shown by arc 106 across a surface of a charged photosensitive cylinder 124 along a line 108. The scanned beam 104 locally charges and discharges the surface of cylinder 124 when the laser diode 102 is turned off and on, respectively, or via other modulation. The scanning may be done using a rotating mirror or a multi-mirrored system (not shown) from which the beam 104 reflects from it. Other methods of moving the scanned beam 104 exist and are known to those of skill in the art. Photosensitive cylinder 124 rotates in a direction indicated by arrow 126. The scanned beam 104 produces a two-dimensional latent image of charged and discharged regions on the surface of the photosensitive cylinder 124 by a controller 110 turning on and off, or otherwise modulating the power, as the beam 104 scans and the photosensitive cylinder rotates. The latent image is developed into a toner image when the surface passes a development station 120, which may be part of a consumable item or a fixed component of the image forming system 100.

The latent image is then transferred to an image forming medium 140, such as paper, vellum, plastic, or other media, on an impression cylinder 130 that rotates in the direction of arrow 132. Any remaining toner on the surface of photosensitive cylinder 124, such as from print jobs or during calibration test cycles, may be cleaned off by a cleaning element 122.

Figure 2:
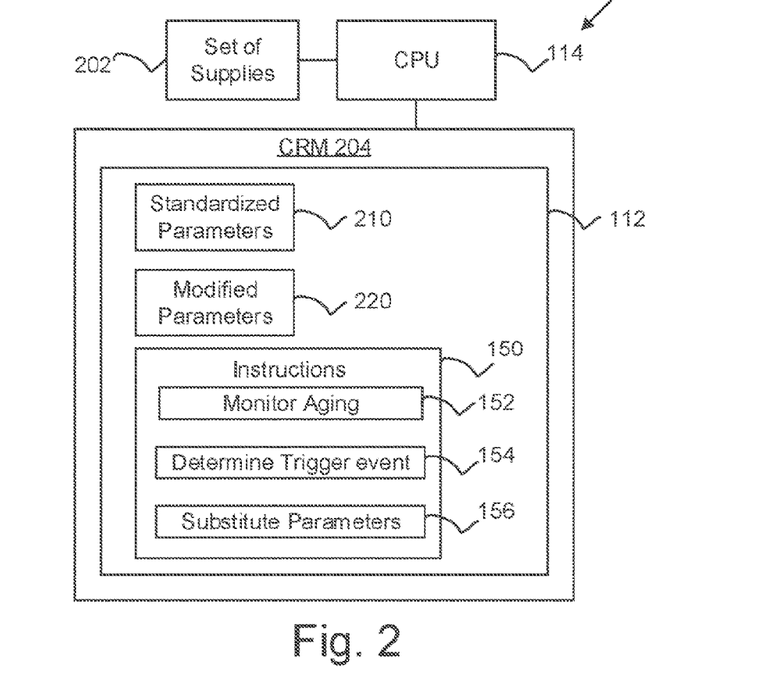
FIG. 2 is a block diagram of an example generic image forming system.

The controller 110 includes one or more processors such as CPU 114 which is coupled to non-transitory and tangible computer readable medium or memory 112. CPU 114 may have one or more cores and/or threads for executing the instructions 150. The controller 110 may include one or more input/output control circuits 116 to allow the CPU 114 to control the modulation of laser diode 102, the respective electrical charges of the photosensitive cylinder 124, and the development station 120 that holds the toner used to create an image on media 140. The memory 112 may include instructions 150 in the form of one or more modules 151 to allow the CPU 110 to monitor aging 152 (FIG. 2) of the systematic engine 145 and a power supply 142 as well as to determine age-related wear and inefficiency trigger events 154 (FIG. 2), and substitute parameters 156 (FIG. 2). The memory 112 may include non-volatile memory that includes "default" parameters 151 also known as standardized parameters (210, FIG. 2). The memory 112 non-volatile memory may also include "healing" parameters 153 also known as modified parameters (220, FIG. 2). In some examples, the one or more of the "standard" or "healing parameters may be stored in non-volatile memory in the system 100 supplies, such as development station 120, which may be included in a supply such as a toner cartridge. The controller 110 may communicate with the photosensitive cylinder 124 and the development station 120 with signals 128, 129 respectively to charge, store parameters, or operate mechanical parts such as gears, rollers, covers, and the like.

Various types of degradations may be seen in different image forming devices that depend on the mechanical configurations, the marking technology used, the expected use environment, and the type of media. For instance, in the example laser-based image forming system 100, the numerous systematic engine and power supply inefficiencies and mechanical wear that may cause degradations include: 1) gear wear, 2) laser diode 102 efficiency changes, 3) optical path degradations, 4) OPC (Organic Photo Conductor) sensitivity, 5) transfer properties, 6) power supply 142 variations, 7) grounding changes, and 8) changes in replacement cartridge properties such as changes to toner in development station 120.

Various image forming key aging characteristics may be monitored to detect an aging event. When one or more such aging events occurs, a triggering event is generated by the controller 110 to allow a user an option of using image forming path modified parameters 220 for "healing" the degradation in place of the "default" or standardized parameters 210. There are various types of age-related triggering events that may come from monitoring key aging characteristics for wear and inefficiencies, such as: 1) the number of images formed, 2) the time the printer has been operated, 4) the number of cleaning cycles, and 5) the number of media jams, as just a few examples. In some implementations, the image forming system 100 may prompt a user whether they wish to print out test pages or patterns of each configuration for comparison and selection. If a user preferred an optimized modified or "healing" optimization, the image forming device system 100 would then use these new "healing" configuration parameters in place of the "default" configuration parameters. As each new aging trigger occurs, the system 100 may re-offer a new potentially improved image forming quality "healing" configuration with different "healing" parameters 153. In addition, the set of "healing" parameters 153 may include multiple sub-sets of "healing" parameters 153. The image forming system 100 may produce a first test pattern with a set of "default" 151 parameters, a second test pattern with a first sub-set of "healing" parameters 153, and a third test pattern with a second sub-set of "healing" parameters 153. The user may then be queried to select which of the first, second, and third test patterns has the best perceived visual acuity and the respective set of parameters is used for configuring the image forming system 100.

Further, as used-up consumable supplies are replaced, the "healing" parameters may be adapted to compensate for the none-aging aspects of the new supply. For instance, a worn gear may be replaced with a new gear, the toner characteristics may have improved due to new toner, etc. If the image forming system 100 determines that the type of supply or its marking material (ink, toner, etc.) are not what is appropriate based on the earner characterization of image forming system 100, the standardized or "default" 151 parameters may be restored fully or perhaps only partially to compensate for any aging aspects of the image forming device itself that have worn or aged, such as power supply components, media path contamination, gear and roller wear, and the like.

Such open-loop compensated "healing" of the image forming device allows a customer to have better longevity of the image forming system 100. Further, additional device supplies may be more likely consumed over the life of the printer allowing a customer to buy supplies in bulk without the fear of obsolescence due to the image forming device wearing out, thus leading to further customer savings.

FIG. 2 is a block diagram of an example generic image forming system 200 independent of any particular media marking technology. The system 200 includes a processor or CPU 114, a set of supplies 202, and a non-transitory and tangible computer readable medium 204 which may include memory 112, which may be a combination of volatile and non-volatile memory. The processor or CPU 114 may be one or more micro-controllers, micro-processors, or other logical controllers, such as digital signal processors, video array processors, and the like. The set of supplies 202 may be one or more consumable items such as dye and/or pigment ink tanks or cartridges, black and white toner cartridges, color toner cartridges, wax sticks, and the like. The CPU 114 is coupled to the set of supplies 202 to allow for the dispensing of the set of supplies 202 onto an image forming media 140 (FIG. 1). The CPU 114 is further coupled to the computer readable medium 204 that contains a set of standardized parameters 210 ("default" parameters 151), a set of modified parameters 220 ("healing" parameters 153) and a set of instructions 150.

The computer readable memory may include memory on the controller 110, including cache memory in CPU 114, separate external cache memory, dynamic random access memory (DRAM), static ram memory (SRAM), non-volatile memory (NVRAM), and/or storage memory such as hard disk drives, flash memory, solid state drives (SSDs) and the like. In some examples, either one or both of the standardized parameters 210 and the modified parameters 220 may be fully or partially stored in NVRAM on one or more supplies of the set of supplies 202. The computer readable medium 204 may also include instructions 150 organized as a set of one or more modules to allow the system 200 to stabilize the image forming quality by using an open-loop method. The instructions may be organized in a module to allow for monitoring the aging 152 of the device 200 and supplies 202. Another module may be organized with instructions to determine when an age related trigger event 154 occurs. Yet another module may be organized with instructions to substitute parameters 156 such as the standardized parameters 210 with the modified parameters 220. In other examples, one set of modified parameters 220 may be substituted for another set of modified parameters 220. In yet another example, such as when a non-appropriate supply is used, a set of modified parameters 220 may be substituted with the set of standardized parameters 210 to restore fully or partially the default printer configuration.

Figure 3:
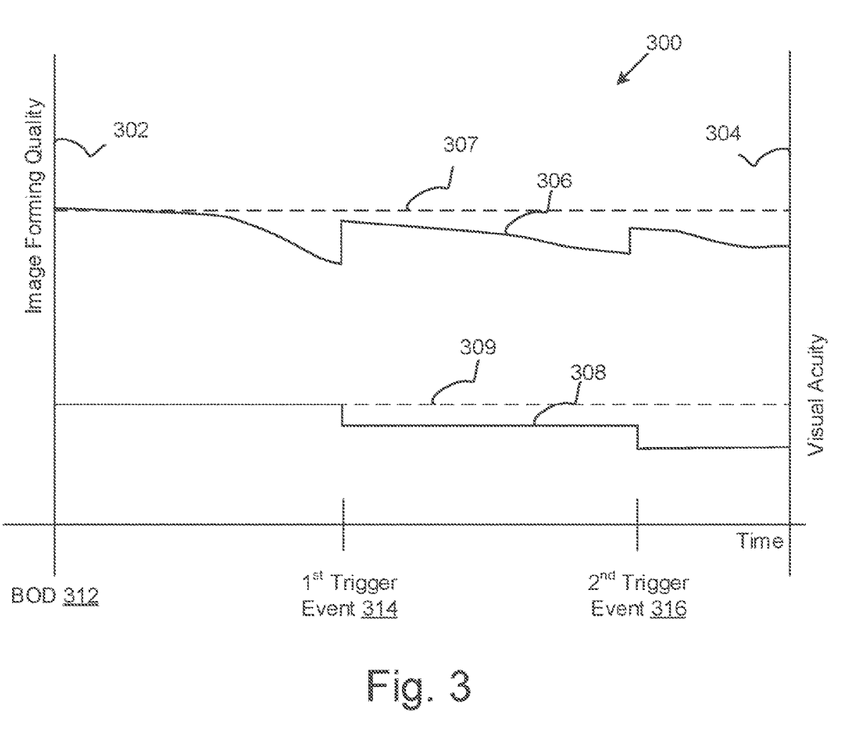
FIG. 3 is a chart of image forming quality and visual acuity over time for an example image forming system.

FIG. 3 is a chart 300 of image forming quality 302 on the left vertical axis and visual acuity 304 on the right vertical axis over time 310 on the horizontal axis for an example image forming system. "Image forming quality" 302 may also be referred to a "print quality" (PQ) in a printing environment context. Other environmental contexts may be placement of chemical or biological material and three-dimensional composition of materials as just a couple of examples. "Image forming quality" 302 may thus refer to the quality of a deposited output, a hard copy, or a printout produced by a printer. There are many factors that determine the level of the quality, but, overall, it has to do with the accuracy of the reproduction of the source material, which is influenced by the quality and type of paper or other media used and, of course, by the specifications of the printer such as the dots per inch (DPI), the print-head capability, and the type and quality of ink/toner used. Further, other considerations such as rotational placement (skew) and horizontal and vertical offset may affect the image forming quality 302 although the imaged formed may meet dots per inch reproducibility requirements it may not be placed on the hard copy as positionally accurate as specified. Thus, image forming quality 302 generally refers to the ability of the image forming device 200 to reproduce accurately the image sent to the system 200 from the image source with respect to image system 200 specifications. On the other hand, "visual acuity" 304 generally refers to how a user of the image forming system 200 is able to perceive or resolve detail within an image. In one example, "visual acuity" may be the relative ability of a user's eye to resolve detail that may be expressed as the reciprocal of the minimum angular separation in minutes of two lines just resolvable as separate and that forms in the average human eye an angle of one minute. In another example, "visual acuity" may be based on psychometric testing and an "acceptability threshold" 308 determined based on statistical analysis of user preferences.

Starting on the "born on date" (BOD) 312, typically the date the printer begins its use, the image forming quality 302 is maximized as the default set of standardized parameters are optimized during manufacture and/or extended lifecycle testing to meet at least the initial performance specifications 307 of the image forming device 200, including a minimal level of visual acuity 304 (line resolution and/or an acceptability threshold 308). As time progresses, the image forming quality 302 begins to slowly degrade due to various degradation factors while the device 200 tries to maintain the initial visual acuity specifications 309. The CPU 114 may monitor various aging characteristics of the image forming system 200 including the set of supplies 202. Various cleaning and calibration cycles may be able to improve the image forming quality 302 at times but overall as the image forming device 200 ages, the image forming quality 302 continues to degrade until a first trigger event 314 is reached. Upon detection of the first triggering event 314 and possibly additional trigger events such as a second triggering event 316, the system 200 may substitute a respective "healing" 153 set of modified parameters 220 for the default 151 set of standardized parameters 210. As such, the image forming system overall image forming quality 302 is increased to improve visual acuity 304, but perhaps not back to quite where the image forming quality 302 originally started, while sacrificing some visual acuity 304 to the acceptability threshold 308. Accordingly, the image forming system 200 does not include a closed-loop feedback system for monitoring and correcting image forming quality 302 but rather implements an open-loop system to stabilize the image forming quality 302 while sacrificing some perceived visual acuity 304 from the initial visual acuity specifications 309 in one or more forms of line resolution, dot spacing, color text quality, tonal range, dot modulation, and the like to mask various wear and inefficiencies of the image forming system 200.

Figure 4:
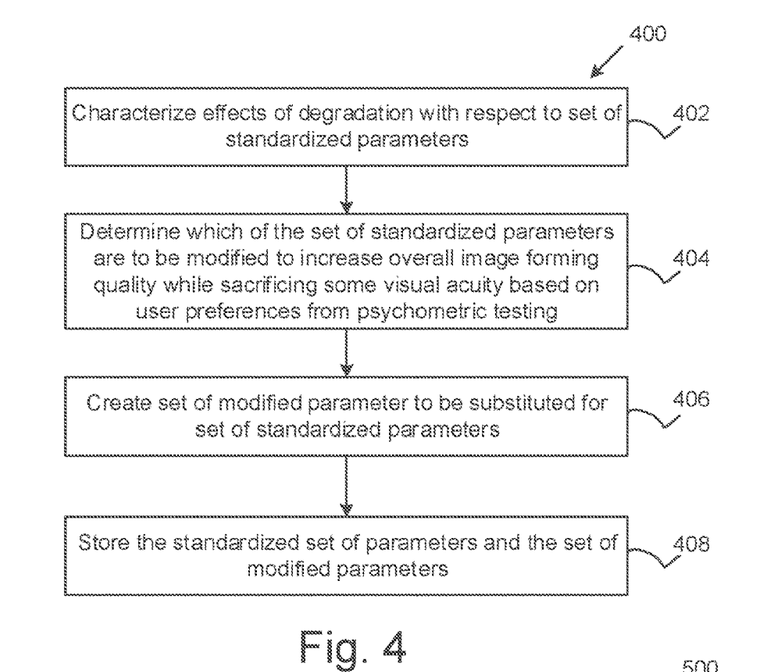
FIG. 4 is a flow chart of an example method to stabilize image forming quality.

FIG. 4 is a flow chart 400 of an example method to stabilize image forming quality 302 with an open-loop technique. In block 402, the effects of image degradation over time related an image forming quality of an image forming device 200, which may include a set of supplies 202, are characterized through extended life testing and performance parameters are recorded over life. For instance, such characterization can be done by running several aging tests by continually cycling the image forming device 200 multiple times in succession. The media output may be sampled and an image quality test performed to see how the image forming quality has changed. For instance, the degradation may be due to numerous inefficiencies and mechanical wear both within the image forming device 200 (including the systematic engine 145 and the power supply 142) and possibly the set of supplies 202. The result of these degradations is an increase in quality artifacts such as banding, tone scaler, scatter, dot growth issues, and uneven line spacing just to name a few. Some of these artifacts may be improved by changing image forming quality tables stored in the image forming device 200, altering the line screens, using more toner or ink, changing the pulse width modulation (PWM) conversion tables of the power supplies and laser diode modulator circuit. By sacrificing some of the visual acuity 304 from the initial visual acuity specifications 309 in order to mask the wear and inefficiencies, the system 200 can improve the image forming quality 302 of a worn systematic engine. While the new image forming quality 302 may not be as crisp as when the systematic engine was new, it is better than the previous image forming quality with the "default" parameters prior to these "healing" image forming quality changes.

In block 404, which of a set of standardized parameters 220 are to be modified is determined on an age-related trigger event to increase overall image forming quality 302 while sacrificing some visual acuity 304 from the initial visual acuity specifications 309 based on user preferences from psychometric testing. "Psychometric testing" generally relates to a field of study concerned with the theory and technique of psychological measurement. In this context, psychometric testing is concerned with the objective measurement of various user's subjective visual perception and their subjective determination of what is an acceptable visual image. Based off the statistics of several users undergoing the psychometric tests, an acceptability threshold 308 may be determined that allows for the tradeoff of various visual acuity improvements for different types of degradations.

For instance, based on the tests of image quality artifacts, various statistical tests may be created to see how a particular artifact changes with time and wear factors. Also, the statistical tests may also include tests using psychometric testing to determine trigger levels for various acceptability threshold 308 stages. Based off these statistical tests, the various age-related trigger event levels may be created, such as for setting the average (expected) or median (most likely) occurrence of one or more age-related triggering events 314, 316 such as the: 1) number of images, 2) time that image forming quality is determined to need adjustment, 3) number of cleaning cycles, and 4) number of paper jams.

in block 406, the set of standardized parameters 210 and the set of modified parameters 220 are stored within a computer readable medium 204 of the imaging forming device 200. Also, in block 408 a set of instructions 150 are stored in the computer readable medium 204 to allow a processor (CPU 114) to read and execute the instructions 150 when the at least one age-related triggering event 314, 316 (such as for wear and inefficiencies) occurs. Then the set of modified parameters 210 are substituted for the standardized set of parameters 220.

Figure 5:
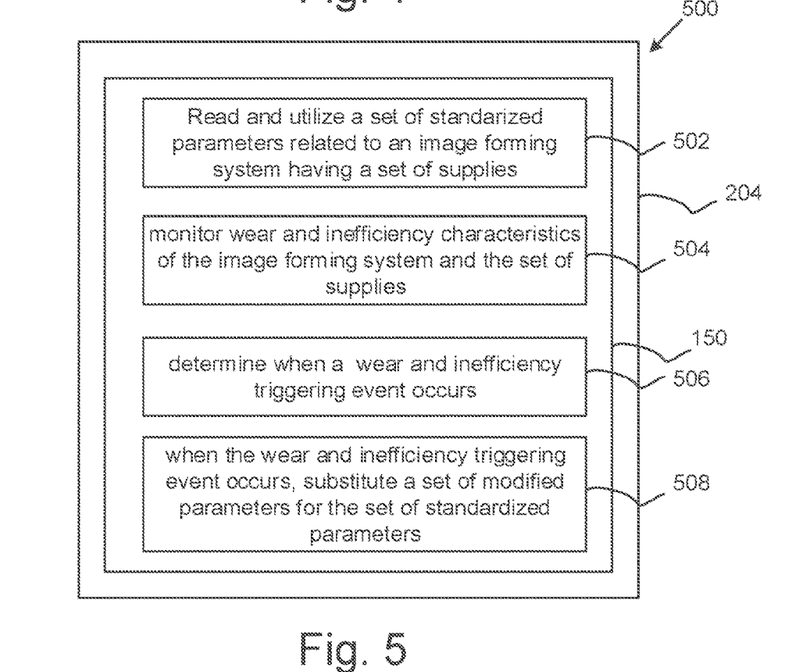
FIG. 5 is a block diagram of an example computer readable medium having instructions to stabilize image forming quality.

FIG. 5 is a block diagram 500 of an example non-transitory tangible computer readable medium 204 having instructions 150 to stabilize image forming quality. The instructions 150 when read and executed by a processor (such as CPU 114) cause the processor to perform operations. For instance, in block 502 a set of standardized parameters 210 are read and utilized. The standardized parameters 210 are related to image forming quality of an image forming system 200 that includes having a set of supplies 202. In block 504, the wear and inefficiency (or aging) characteristics of the image forming system 200 and the set of supplies 202 are monitored and determined in block 506 when a wear and inefficiency triggering event 314, 316 occurs. In block 508, when the wear and inefficiency triggering event 314, 316 occurs, a set of modified parameters 220 are substituted for the set of standardized parameters 210. The substitution causes an increase in the overall image forming quality 302 to improve visual acuity to an acceptability threshold 308 while perhaps sacrificing some visual acuity 304 from the initial visual acuity specifications 309. By making the substitution of parameters, the image forming system 200 does not have to include a closed loop feedback system to monitor and correct for image forming quality 302. That is, an open-loop system is created instead based on the statistical analysis of image forming quality results and user preferences from psychometric user testing of visual acuity during age-related extended-life characterization to determine which of the standardized parameters 210 may be modified. The resulting determined modified parameters 220 that restore at least some partial image forming quality 302 at the expense of some loss of visual acuity 304.

Figure 6:
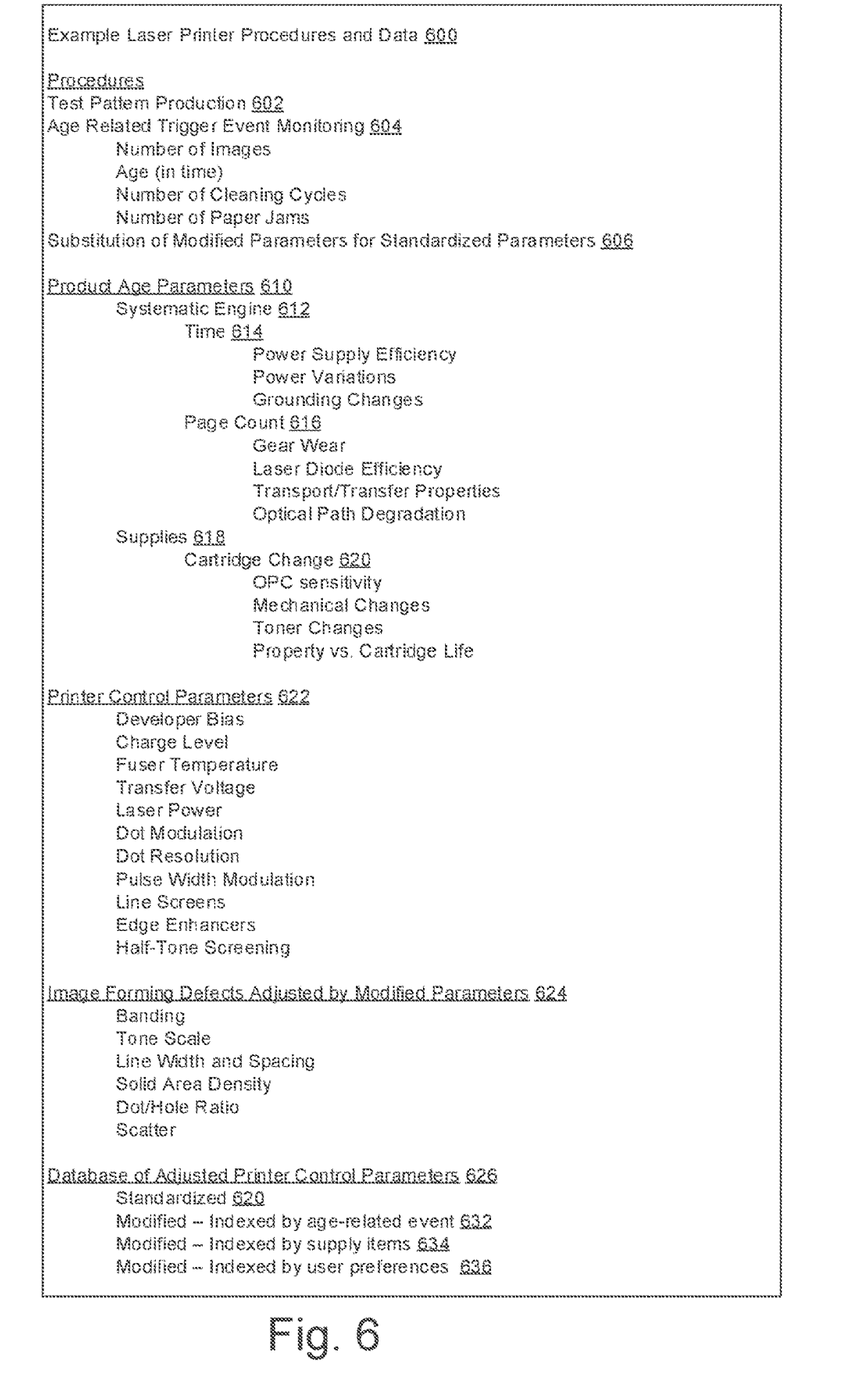
FIG. 6 is a chart of example procedures and parameters stored on a computer readable medium in one example of an image forming system.

FIG. 6 is a chart 600 of example procedures and parameters stored on a computer readable medium 204 in one example of a laser-based image forming system 100 (FIG. 1). One of the various procedures or modules of instructions may include test pattern production 602 to create a first test pattern with the set of standardized parameters 210 and a second test pattern with the set of modified parameters 220. Test pattern production 602 may also include instructions to allow a user of the laser-based image forming system 100 to determine whether the respective set of modified parameters 220 are to substitute for the set of standardized parameters 210. Another procedure includes instructions for age-related trigger event monitoring 604. Various different trigger events may be created and in this laser-based example, some may include monitoring the number of images, the amount of time that has elapsed since the BOD, the number of cleaning cycles, and the number of paper jams. Further, the instructions may also allow a user to be queried prior to producing the first and second test patterns when the age-related trigger event occurs. Yet another procedure may include instructions to allow for the substitution of the modified parameters for the standardized parameters 606. The instructions may also allow the set of supplies of the laser-based image forming device 100 to be checked to ensure that the respective set of modified parameters 220 are appropriate for the set of supplies 202 based on the extended-life characterization, and if not appropriate, the set of modified parameters 220 is not to be substituted for the set of standardized parameters 210.

For the laser-based image forming system 100 of FIG. 1, some of the product related aging parameters 610 may include parameters for one of or both the systematic engine parameters 612 and supplies parameters 618. The systematic engine parameters 612 may include both time parameters 614 and page count parameters 616. The time parameters 614 may include such component wear artifacts such as power supply efficiency, power variations, grounding changes, etc. due to component wear-out of capacitors, coils, resistors, transformers, etc. The page count parameters 616 may include such page related artifacts such as gear wear and/or transport/transfer properties of the systematic engine 145, efficiency of laser diode 102, and/or optical path degradation, such as dust or change in coatings on the optical mirrors. The supplies parameters 618 may include artifacts that occur based on cartridge change 620. For instance, when a cartridge is changed, the OPC sensitivity may be affected. There may be mechanical changes due to part tolerances or new parts being used that may affect gear torque. There may be changes to toner electrical, optical, and chemical properties. Further, the supplies artifact properties may also be affected by cartridge life, such as oxidation, moisture related issues, contamination, etc.

The printer control system such as controller 110 (FIG. 1) may also have parameters that are affected with age due to component changes such as capacitor value and dielectric leakage issues. Such printer control parameters 642 include the developer bias, charge levels, fuser temperature, transfer voltage, and laser power. The laser-based image forming system 100 may also have system wide image forming parameters that can be adjusted by the modified parameters 220. For instance, banding may be caused by several different artifacts as well as tone scale, line width and spacing, solid area density, dot/hole ratio, and scatter.

The computer readable medium may also be organized as a database of adjusted printer control parameters. The database may be organized on row or columns, table based, or other database record organizations as known to those of skill in the art. The data base may include the set of standardized parameters 620, the modified parameters indexed by age-related events 632, the modified parameters indexed by supply items 634 (such as a different set of modified parameters for each color of a set of color toner cartridges), and the modified parameters indexed by user preferences 636 based on various psychometric testing and statistical analysis of the age-related characterization and how various modified parameters affect both the image forming quality 302 and the visual acuity 304.

Figure 7:
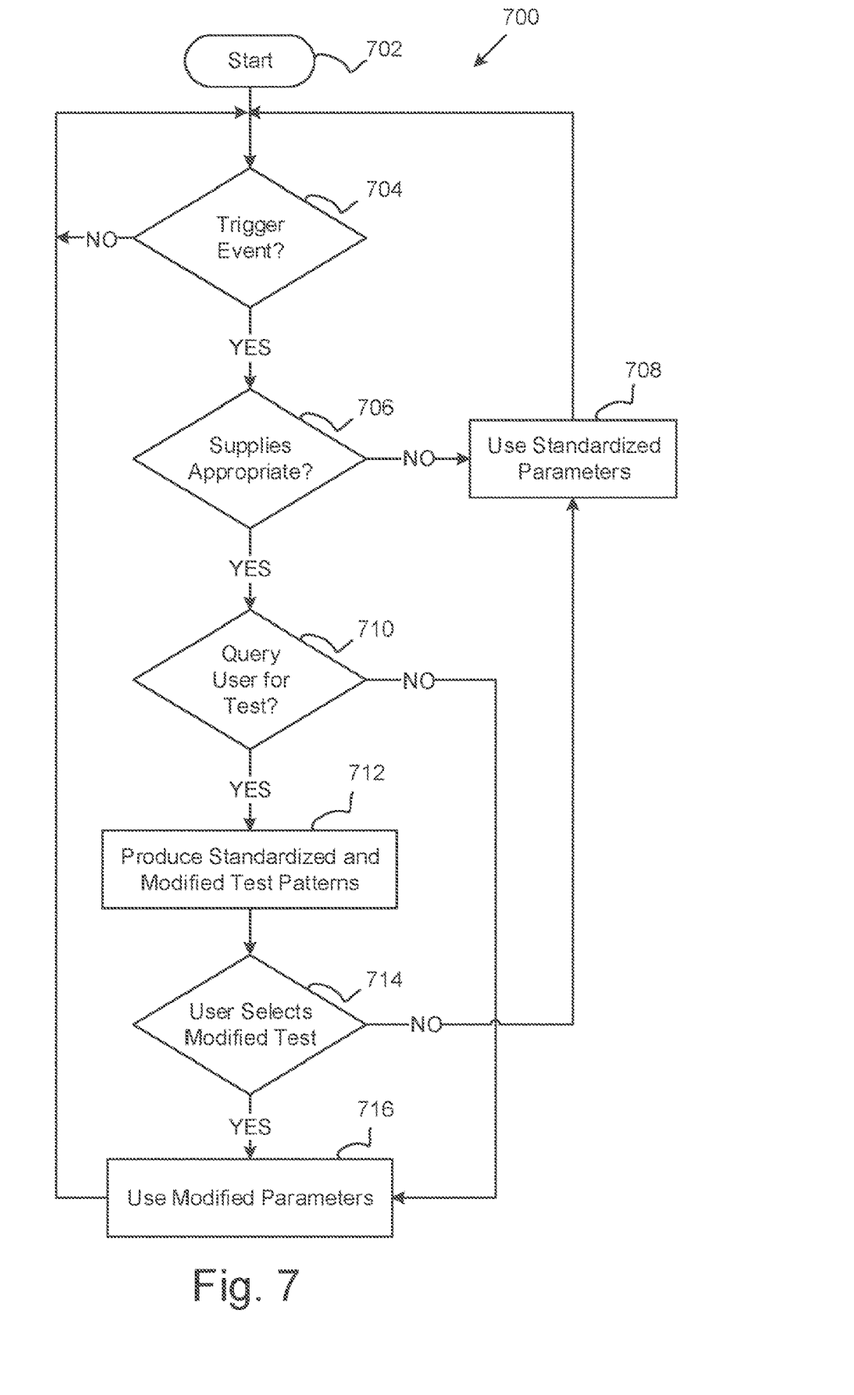
FIG. 7 is a flow chart of an example procedure to substitute a set of standardized parameters with a set of modified parameters to stabilize image forming quality.

FIG. 7 is a flow chart 700 of an example procedure to substitute a set of standardized parameters 210 with a set of modified parameters 220 to stabilize image forming quality. The procedure starts in block 702 and proceeds to decision block 704 where it is determined whether an age-related triggering event 314, 316 has occurred or not. This may be done by monitoring aging characteristics of the image forming system 200 and the set of supplies 202. If not, then decision block 704 is continually checked. When the age-related triggering event 314, 316 does occur, then the procedure checks in decision block 706 whether the supplies are appropriate. For instance, the supplies would be appropriate if they have been characterized in the age-related extended-life system characterization. If a supply has not been characterized such as when a new model supply is introduced, a substitute supply is used, a substitute supply has improper toner or ink refills, then a supply may be determined as not appropriate. If not appropriate, then in block 708 the standardized parameters are used and the image forming quality 302 may not be able to be adjusted. In this situation, the system would "do no harm" because by not knowing the characteristic of non-appropriate supplies, the image forming system 200 may not be able to effectively deliver predicable alternatives based on modified parameters. The procedure then proceeds back to decision block 704 to continue to check for trigger events.

In the event, the supply is replaced with an appropriate supply, then in decision block 710, the user may be queried whether to produce test patterns. If the user does not want to perform the test patterns, then the procedure proceeds to block 716 to use the modified parameters 220. If the user does want to perform the test patterns, then in block 712 the image forming system 200 produces a first test pattern with the set of standardized parameters 210 and a second test pattern with the set of modified parameters 220. These test patterns may be on the same or separate pages of media. In decision block 714, the user selects or determines that the set of modified parameters 220 are to substitute for the set of standardized parameters 210 in block 716 or whether to just use the standardized parameters 210 in block 708. In either case, the procedure returns to decision block 704 to continue to determine when an age-related triggering event 314, 316 occurs.

Accordingly, a customer or user of image forming devices is able to prolong the effective life of the device with minor degradation of image quality. In one example, the bill of materials for the device may be reduced by not incorporating a closed-loop feedback system to monitor and adjust the image forming systematic engine and supply parameters. For instance, a color laser printer system typically has a closed-loop feedback system and the use of the open-loop technique of this disclosure allows for the elimination of such a closed-loop feedback system. In another example, a monochrome laser printer system may not have a closed-loop feedback system, however, incorporation of the open-loop technique of this disclosure can improve the life, the image forming quality, and the perceived visual acuity of the system. Accordingly, overall customer satisfaction may be improved by having a low cost, long effective life image forming system using the open-loop technique disclosed and claimed herein.

While the claimed subject matter has been particularly shown and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method of open-loop stabilizing image forming quality, comprising:
    characterizing image degradation over time related to an image forming quality of an imaging forming device having a set of supplies;
    determining which of a set of standardized parameters are to be modified on an age-related trigger event to increase overall image forming quality to improve visual acuity beyond an acceptability threshold based on user preferences from psychometric testing;
    creating a set of modified parameters based on the age-related triggering event and the acceptability threshold;
    storing the set of standardized parameters and the set of modified parameters within a computer readable medium of the imaging forming device; and
    storing a set of instructions in the computer readable medium to allow a processor to read and execute the instructions when the age-related triggering event occurs to substitute the set of modified parameters for the standardized set of parameters.

2. The method of claim 1, wherein there are multiple sets of modified parameters and each of the multiple set of modified parameters are optimized to improve image forming quality for different respective age-related triggering events.

3. The method of claim 1, wherein there are multiple sets of modified parameters and each of the multiple set of modified parameters are optimized to improve image forming quality for different respective supplies of the image forming system.

4. The method of claim 1, wherein each modified parameters of the set of modified parameters has multiple parameter values for respective age-related triggering events based on the psychometric testing.

5. An open-loop image forming system to stabilize image forming quality, comprising:
    a set of supplies used in forming an image;
    a non-transitory computer readable memory storing a set of standardized parameters and at least one set of modified parameters, each set related to image forming quality, the memory further including a set of instructions;
    a processor coupled to the memory and the set of supplies, the processor to execute the instructions wherein the instructions allow the processor to:
        monitor aging characteristics of the image forming system including the set of supplies;
        determine when an age-related triggering event occurs;
        substitute a respective set of modified parameters for the standardized set of parameters after the age-related triggering event occurs, wherein the overall image forming quality is increased while sacrificing some visual acuity based on user preferences from psychometric testing.

6. The system of claim 5, wherein the image forming system is to produce a first test pattern with the set of standardized parameters and a second test pattern with the respective set of modified parameters and a user of the image forming system to determine that the respective set of modified parameters are to substitute for the set of standardized parameters.

7. The system of claim 6, wherein when the age-related trigger event occurs, the user is to be queried prior to producing the first and second test patterns.

8. The system of claim 6, wherein multiple age-related triggering events occur and the user is to be queried prior to producing the first and second test patterns for each multiple age-related triggering event.

9. The system of claim 5, wherein the set of supplies of the image forming device are to be checked to ensure that the respective set of modified parameters are appropriate for the set of supplies and if not appropriate, the set of modified parameters is not to be substituted for the set of standardized parameters.

10. A non-transitory computer readable medium, comprising instructions to stabilize image forming quality, the instructions when read and executed by a processor cause the processor to:
    read and utilize a set of default parameters related to image forming quality of an image forming system having a set of supplies;
    monitor wear and inefficiency characteristics of the image forming system and the set of supplies;
    determine when at least one of a wear and an inefficiency triggering event occurs; and
    when the at least one of the wear and the inefficiency triggering event occurs, substitute a set of healing parameters for the set of default parameters to increase the overall image forming quality to improve visual acuity beyond an acceptability threshold based on user preferences from psychometric testing, and wherein the image forming system does not include a closed loop feedback system for monitoring and correcting image forming quality.

11. The medium of claim 10, wherein the image forming system to produce a first test pattern with the set of default parameters and a second test pattern with the set of healing parameters and a user to determine that the set of healing parameters are to substitute for the set of default parameters.

12. The medium of claim 11, wherein when the at least one of a wear and inefficiency triggering event occurs, the user is to be queried prior to producing the first and second test patterns.

13. The medium of claim 11, wherein multiple wear and inefficiency triggering events occur and the user is to be queried prior to producing the first and second test patterns.

14. The medium of claim 10, wherein the supplies of the image forming device are to be checked to ensure that the set of healing parameters are appropriate for the supplies and if not appropriate, the set of healing parameters are not to be substituted for the set of default parameters.

15. The medium of claim 10, wherein the set of healing parameters includes multiple sub-sets of healing parameters and the image forming system to produce a first test pattern with the set of default parameters, a second test pattern with a first sub-set of healing parameters, and a third test pattern with a second subset of healing parameters and a user is to be queried to select which of the first, second, and third test patterns has the best visual acuity.

* * * * *

UNITED STATES PATENT AND TRADEMARK OFFICE
CERTIFICATE OF CORRECTION

PATENT NO. : 10,375,272 B2  
APPLICATION NO. : 15/778411  
DATED : August 6, 2019  
INVENTOR(S) : Marvin D Nelson et al.

Page 1 of 1

It is certified that error appears in the above-identified patent and that said Letters Patent is hereby corrected as shown below:

In the Claims

In Column 10, Line 61, Claim 10, delete "haying" and insert -- having --, therefor.

In Column 11, Line 5, Claim 10, delete "dosed" and insert -- closed --, therefor.

In Column 11, Line 30, Claim 15, delete "subset" and insert -- sub-set --, therefor.

Signed and Sealed this  
Nineteenth Day of November, 2019

Andrei Iancu  
*Director of the United States Patent and Trademark Office*